US008582153B2

(12) United States Patent
Nitta

(10) Patent No.: US 8,582,153 B2
(45) Date of Patent: Nov. 12, 2013

(54) IMAGE FORMING APPARATUS AND METHOD

(75) Inventor: Tsuyoshi Nitta, Osaka (JP)

(73) Assignee: KYOCERA Document Solutions inc. (JP)

( * ) Notice: Subject to any disclaimer, the term of this patent is extended or adjusted under 35 U.S.C. 154(b) by 744 days.

(21) Appl. No.: 12/794,899

(22) Filed: Jun. 7, 2010

(65) Prior Publication Data

US 2010/0309517 A1 Dec. 9, 2010

(30) Foreign Application Priority Data

Jun. 8, 2009 (JP) ................................. 2009-137644

(51) Int. Cl.
G06F 3/12 (2006.01)
G06K 15/00 (2006.01)
H04N 1/40 (2006.01)
G06Q 10/00 (2012.01)

(52) U.S. Cl.
USPC .......... 358/1.15; 358/1.16; 358/1.9; 358/448; 358/1.13; 705/7.12

(58) Field of Classification Search
None
See application file for complete search history.

(56) References Cited

U.S. PATENT DOCUMENTS

| 6,278,901 | B1 * | 8/2001 | Winner et al. .................. 700/99 |
| 2002/0030827 | A1 | 3/2002 | Kotaka |
| 2006/0188284 | A1 | 8/2006 | Ikeda |
| 2006/0193006 | A1 * | 8/2006 | Lawrence et al. ............ 358/1.16 |
| 2008/0007754 | A1 | 1/2008 | Torii |
| 2008/0246994 | A1 * | 10/2008 | Matsumoto et al. ......... 358/1.15 |

FOREIGN PATENT DOCUMENTS

| CN | 1825212 | 8/2006 |
| JP | 2002-084387 | 3/2002 |
| JP | 2003-241983 | 8/2003 |
| JP | 2004-192507 | 7/2004 |
| JP | 2008-15605 | 1/2008 |

* cited by examiner

Primary Examiner — Thomas Lett
(74) Attorney, Agent, or Firm — McDonnell Boehnen Hulbert & Berghoff LLP

(57) ABSTRACT

Provided is an image forming apparatus including a plurality of resources (for example, circuits) for implementing a plurality of functions and executing jobs in order of priority by using these resources. A conflict judging section determines whether any one of the resources required for a particular one of pending jobs is the same as any one of the resources required for pending jobs having a priority higher than that of the particular job. When it has been determined by the conflict judging section that any one or more of the resources required for the particular job is not the same as any of the resources required for pending jobs having a priority higher than that of the job, a job managing section provides the particular job a right of execution.

17 Claims, 5 Drawing Sheets

|  | JOB #1 | JOB #2 | JOB #3 | JOB #4 | JOB #5 |
|---|---|---|---|---|---|
| RESOURCE A | USE |  | USE |  |  |
| RESOURCE B | USE | USE |  |  |  |
| RESOURCE C |  | USE |  | USE |  |
| RESOURCE D |  |  | USE | USE |  |
| RESOURCE E |  |  |  |  | USE |
| RESOURCE F |  |  |  |  | USE |

FIG.3

IMAGE FORMING APPARATUS AND METHOD

INCORPORATION BY REFERENCE

This application is based upon and claims the benefit of priority from corresponding Japanese Patent Application No. 2009-137644, filed Jun. 8, 2009, the entire contents of which is incorporated herein by reference.

BACKGROUND

1. Field of the Invention

The present invention relates to an image forming apparatus and method.

2. Description of the Related Art

One printing system includes a plurality of printing units and determines to which printing unit(s) each page of Page Description Language (PDL) data should be allocated by the function of each printing unit. By the above-described printing system, distributed processing of the PDL data is realized.

One image forming apparatus includes a plurality of raster image processors (RIPs), divides data into pieces on a page by page basis, and allocates any one of the pieces of data to any one of the RIPs.

Recently, high speed image processing has been realized by performing pipeline processing using circuits that are installed in an image forming apparatus and performs a plurality of different kinds of image processing (for example, such as image rotation processing and image enlargement/reduction processing). In the case that a plurality of circuits perform different kinds of image processing, only some portions of the circuits are used depending on the type of a job to be executed. In the above-described image forming apparatus, some circuit portions are not used, and hence the utilization factor of the plurality of circuits is reduced.

In the case that a plurality of circuits such as the RIPs are installed for performing one kind of image processing in an image forming apparatus, the utilization factor may be increased by dividing data into pieces. However, in the case that a plurality of circuits are installed for performing different kinds of image processing, the utilization factor will not be increased even if data is divided into pieces.

In addition, by the above-described printing system, each page of PDL data is allocated by the function of the printing unit, so that the utilization factor may be slightly increased. However, even if this technique is applied to a plurality of image forming apparatuses, each having a plurality of circuits for performing different kinds of image processing, such a problem will occur that some circuits are unused in each of the image forming apparatuses depending on the type of the page allocated.

SUMMARY

The present disclosure relates to an image forming apparatus and method for increasing the utilization factor of resources that perform a plurality of different kinds of image processing.

According to one aspect of the present disclosure, there is provided an image forming apparatus that executes pending jobs in order of priority. The apparatus comprises resources used for executing the pending job, a conflict judging section, and a job managing section. The conflict judging section is configured to determine whether any one of the resources required for a particular one of the pending jobs is the same as any one of the resources required for pending jobs having a priority higher than that of the particular job. The job managing section is configured to provide the particular job a right of execution responsive to a determination by the conflict judging section that any one or more of the resources required for the particular job is not the same as any of the resources required for pending jobs having a priority higher than that of the particular job.

According to another aspect of the present disclosure, there is provided an image forming method of executing pending jobs in order of priority using resources. The method comprises a conflict judging step and a job managing step. The conflict judging step comprises determining whether any one of the resources required for a particular one of the pending jobs is the same as any one of the resources required for pending jobs having a priority higher than that of the particular job. The job managing step comprises giving the particular job a right of execution responsive to a determination in the conflict judging step that any of the resources required for the particular job is not the same as any of the resources required for the pending jobs having a priority higher than that of the particular job.

Additional features and advantages are described herein, and will be apparent from the following Detailed Description and the figures.

BRIEF DESCRIPTION OF THE DRAWINGS

In the accompanying drawings:

FIG. 3 is a diagram illustrating an example of a resource specification table illustrated in FIG. 2;

DETAILED DESCRIPTION

Figure 1:
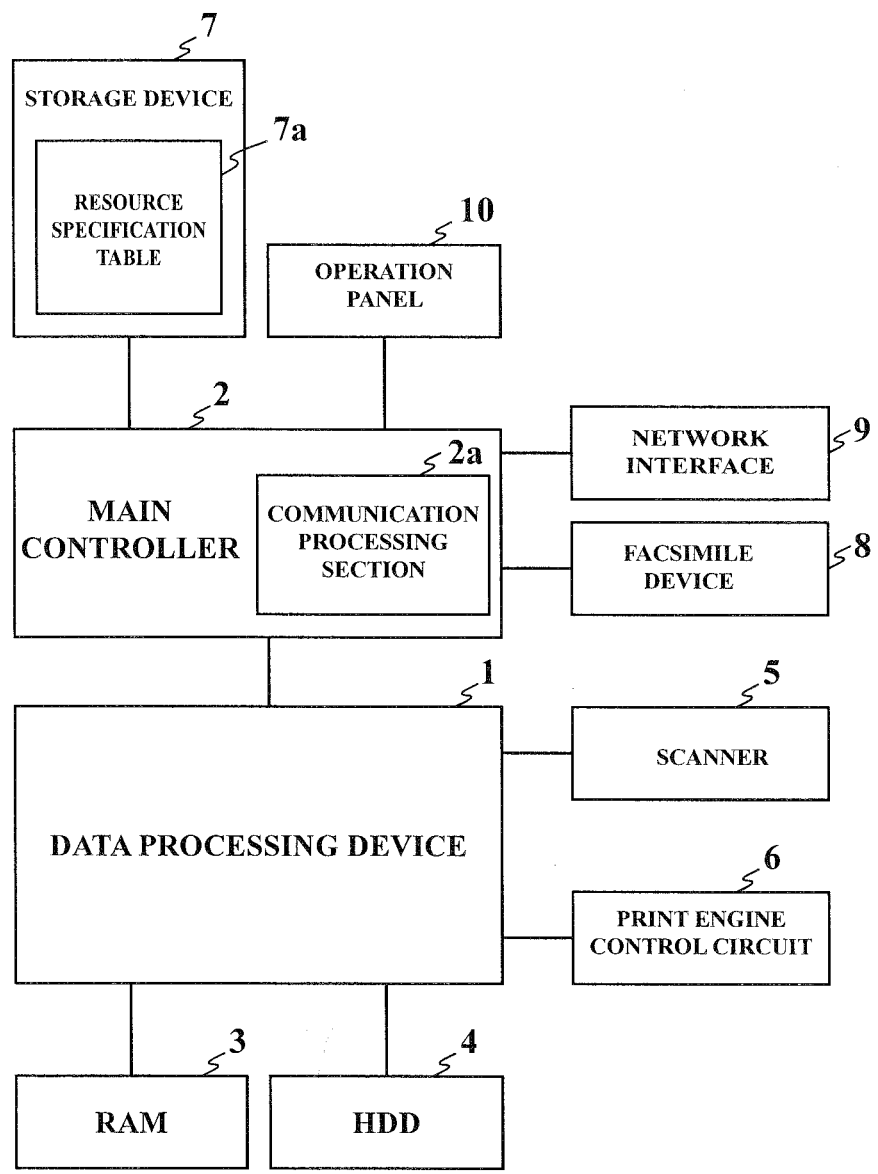
FIG. 1 is a block diagram illustrating an example of a configuration of an image forming apparatus according to an embodiment of the present invention.
Figure 2:
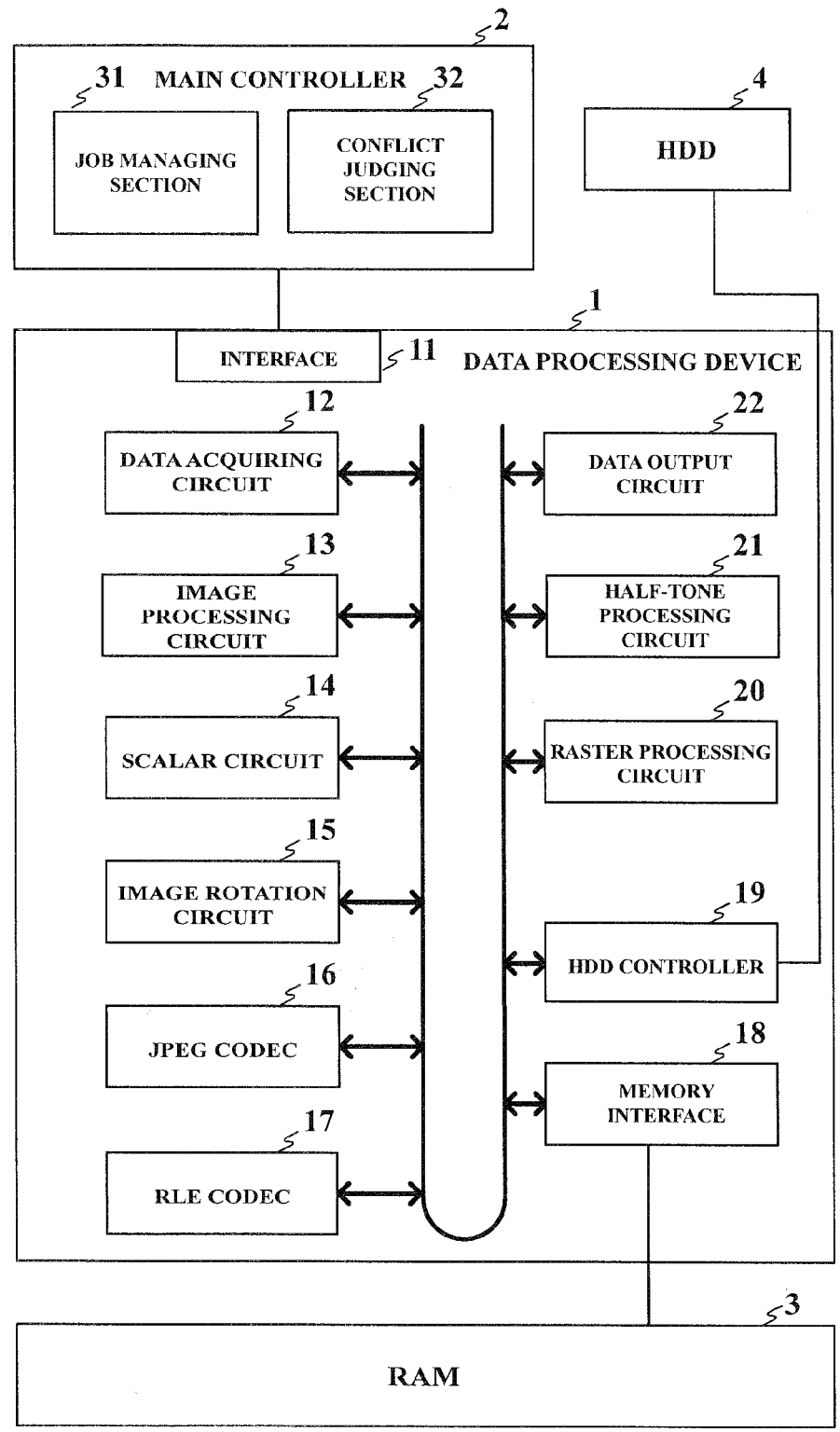
FIG. 2 is a block diagram illustrating an example of a configuration of a data processing device illustrated in FIG. 1.

FIG. 1 is a block diagram illustrating an example of a configuration of an image forming apparatus according to an embodiment. FIG. 2 is a block diagram illustrating an example of a configuration of a data processing device 1 illustrated in FIG. 1.

The image forming apparatus illustrated in FIG. 1 includes the data processing device 1, a main controller 2, a Random Access Memory (RAM) 3, a hard disk drive (HDD) 4, a scanner 5, a print engine control circuit 6, a storage device 7, a facsimile device 8, a network interface 9, an operation panel 10 and a print engine (not illustrated) for printing an image on a sheet of paper.

The data processing device 1 performs processing of image data sent from the scanner 5 in units of bands or in units of pages and outputs the processed data to the main controller 2, the HDD 4, the print engine control circuit 6, and the like. The image data is output from the scanner 5 together with attribute data corresponding to the image data, so that the data processing device 1 performs processing on both of them. The attribute data is used for setting color processing and gradation processing in image processing. The attribute data includes information, for example, as to whether a pixel is a part of a character. The image data and the attribute data are page data, which is generated per page or band data that is one of a plurality of bands obtained by dividing one page.

The main controller 2 controls the operations of the scanner 5, the facsimile device 8, and the network interface 9 on the basis of a user operation performed through the operation panel 10 and supplies a command to the data processing device 1.

The main controller 2 is a computer (that is, a processor) having a Central Processing Unit (CPU), a Read Only Memory (ROM) and a RAM. The main controller 2 outputs a command and performs data processing in accordance with a program stored in the ROM. The main controller 2 executes programs to implement processing sections as follows.

The main controller 2 includes a communication processing section 2a for controlling the operations of the facsimile device 8 and the network interface 9 to perform data processing on transmission data. In addition, as illustrated in FIG. 2, the main controller 2 also includes a job managing section 31 and a conflict judging section 32.

The job managing section 31 generates a job on the basis of a user operation performed through the operation panel 10 and manages execution of one or more jobs. In the case that the conflict judging section 32 has judged that any of the resources required for the generated job is not the same as any of the resources required for an incomplete job having a priority higher than that of the generated job, the job managing section 31 provides the generated job the right of execution.

The conflict judging section 32 decides whether any one or more resources (for example, circuits 13, 14, 15, 20 and 21 in the data processing device 1) used for a job is the same as any one or more resources used for an incomplete job having a priority higher than that of the job.

The RAM 3 is a memory for temporarily storing band data in execution of processing by the data processing device 1. As the RAM 3, for example, one or more Dynamic RAMs (DRAMs) may be used.

The HDD 4 is a data storage device for storing page data consisting of band data of one page. The HDD 4 has a data size larger than that of the RAM 3 and an operation speed lower than that of the RAM 3. For example, compressed band data is stored in the HDD 4 on a page by page basis.

The scanner 5 optically reads image(s) on one surface or both surfaces of an original and outputs image data and attribute data obtained by reading the image(s). The scanner 5 sequentially outputs the image data and the attribute data generated by reading the image(s) as band data.

The print engine control circuit 6 supplies print image data to the print engine and controls the operation of the print engine to execute printing.

The storage device 7 stores data and programs that the main controller 2 uses. As the storage device 7, a nonvolatile memory such as a ROM, a flash memory, a hard disk drive, and/or the like are used. A resource specification table 7a is stored in the storage device 7 while the main controller 2 is being operated. The resource specification table 7a will be described later.

The facsimile device 8 transmits facsimile data generated from the image data and generates image data from received facsimile data.

The network interface 9 is a communication device that is connected to a network. It performs data communication with a terminal device via the network.

The operation panel 10 includes a display unit for displaying various pieces of information and an input unit for detecting user operations and outputting electric signals corresponding to the respective user operations. As the display unit, for example, a liquid crystal display is used. As the input unit, for example, touch panel, a key switch, and the like are used. The input unit of the operation panel 10 detects a user operation for inputting the kind of a job and a user operation for inputting an attribute of the job.

FIG. 2 shows the configuration of the data processing device 1.

The data processing device 1 includes an interface 11, a data acquiring circuit 12, an image processing circuit 13, a scalar circuit 14, an image rotation circuit 15, a Joint Photographic Experts Group (JPEG) codec 16, a Run Length Encoding (RLE) codec 17, a memory interface 18, an HDD controller 19, a raster processing circuit 20, a half-tone processing circuit 21, and a data output circuit 22. The data acquiring circuit 12, the image processing circuit 13, the scalar circuit 14, the image rotation circuit 15, the JPEG codec 16, the RLE codec 17, the memory interface 18, the HDD controller 19, the raster processing circuit 20, the half-tone processing circuit 21, and the data output circuit 22 are connected to a bus and image data and attribute data are transmitted through the bus. Among these circuits, one or more circuits which have the right to use the bus send the data to the bus when a request for data transmission is generated. When one request for bus use is generated in conflict with another request for bus use, the circuit having the higher priority is allowed to use the bus preferentially.

The interface 11 accepts command(s) from the main controller 2 and causes the circuits 12, 13, 14, 15, 16, 17, 20, 21 and 22 to operate in accordance with the command(s).

The data acquiring circuit 12 acquires the image data and the attribute data from the scanner 5 as band data to store the data in the RAM 3.

The image processing circuit 13 reads the band data of the image data and the attribute data from the RAM 3, executes predetermined image processing (image 180-degree rotation processing, color conversion processing and the like) on the band data, and stores the processed band data in the RAM 3.

The scalar circuit 14 reads the band data of the image data and the attribute data from the RAM 3, executes image enlargement processing or image reduction processing on the band data and stores the processed band data in the RAM 3.

The image rotation circuit 15 acquires image data from the bus and generates image data obtained by rotating the acquired image data by 90 or −90 degrees.

The JPEG codec 16 reads the band data of the image data from the RAM 3, compresses by encoding the band data by a JPEG format and stores the compressed data in the HDD 4. Then, the JPEG codec 16 reads the band data from the page data of the image data stored in the HDD 4, decompresses by decoding the band data by the JPEG format, and stores the decompressed band data in the RAM 3.

The RLE codec 17 reads the band data of the attribute data from the RAM 3, compresses by encoding the band data by an RLE format and stores the compressed band data in the HDD 4. Then, the RLE codec 17 reads the band data from the page data of the attribute data stored in the HDD 4, decompresses by decoding the band data by the RLE format, and stores the decompressed band data in the RAM 3.

The memory interface 18 transmits and receives data and commands between the RAM 3 and the bus.

The HDD controller 19 reads data from the HDD 4 and writes data into the HDD 4.

The raster processing circuit 20 reads the band data of the image data and the attribute data from the RAM 3 and performs rasterizing the band data to generate raster data. The raster data is compressed by the RLE codec 17 on a band by band basis and stored in the HDD 4. Then, the compressed raster data is read from the HDD 4 and decompressed on a band by band basis by the RLE codec 17, and stored in the RAM 3.

The half-tone processing circuit 21 reads the raster data from the RAM 3 on a band by band basis, performs half-tone processing on the data, and stores the data on which the half-tone processing has been performed in the RAM 3.

The data output circuit 22 supplies the band data that has been read from the HDD 4 and decompressed by the JPEG codec 16 or the RLE codec 17 to the communication processing section 2*a* and reads the data on which the half-tone processing has been performed from the RAM 3 and supplies the data to the print engine control circuit 6. The data output circuit 22 supplies the data in the case of a copy job to the print engine control circuit 6 for execution of the copy job and supplies the data in the case of a transmission job to the communication processing section 2*a* for execution of the transmission job.

It should be noted that the above-described circuits 11, 12, 13, 14, 15, 16, 17, 18, 19, 20, 21 and 22 may be respectively implemented as Application Specific Integrated Circuits (ASICs).

In the data processing device 1, some circuits that consume a long process time per band (or per page) are managed as resources by the job managing section 31 and the conflict judging section 32. Therefore, in this embodiment, the circuits 13, 14, 15, 20 and 21 are managed as the resources by the job managing section 31 and the conflict judging section 32. Other circuits are not managed as resources.

Next, the resource specification table 7*a* will be described.

The resource specification table 7*a* indicates resources that incomplete jobs use. The priority of each job is set for each job in the resource specification table 7*a*.

In generation of a job, the job managing section 31 specifies the resources that the job uses and the priority of the job and registers the specified resources and priority in the resource specification table 7*a*. When execution of the job is completed, the job managing section 31 deletes the record of the job from the resource specification table 7*a*.

FIG. 3 is a diagram illustrating an example of the resource specification table 7*a* illustrated in FIG. 1. In the resource specification table 7*a* illustrated in FIG. 3, records of jobs #1, #2, #3, #4, and #5 are registered. For example, it is indicated that the job #1 uses resources A and B. In FIG. 3, the priority of the job #1 is the highest and the priority is gradually decreased in order of the jobs #2, #3, #4, and #5.

Figure 4:
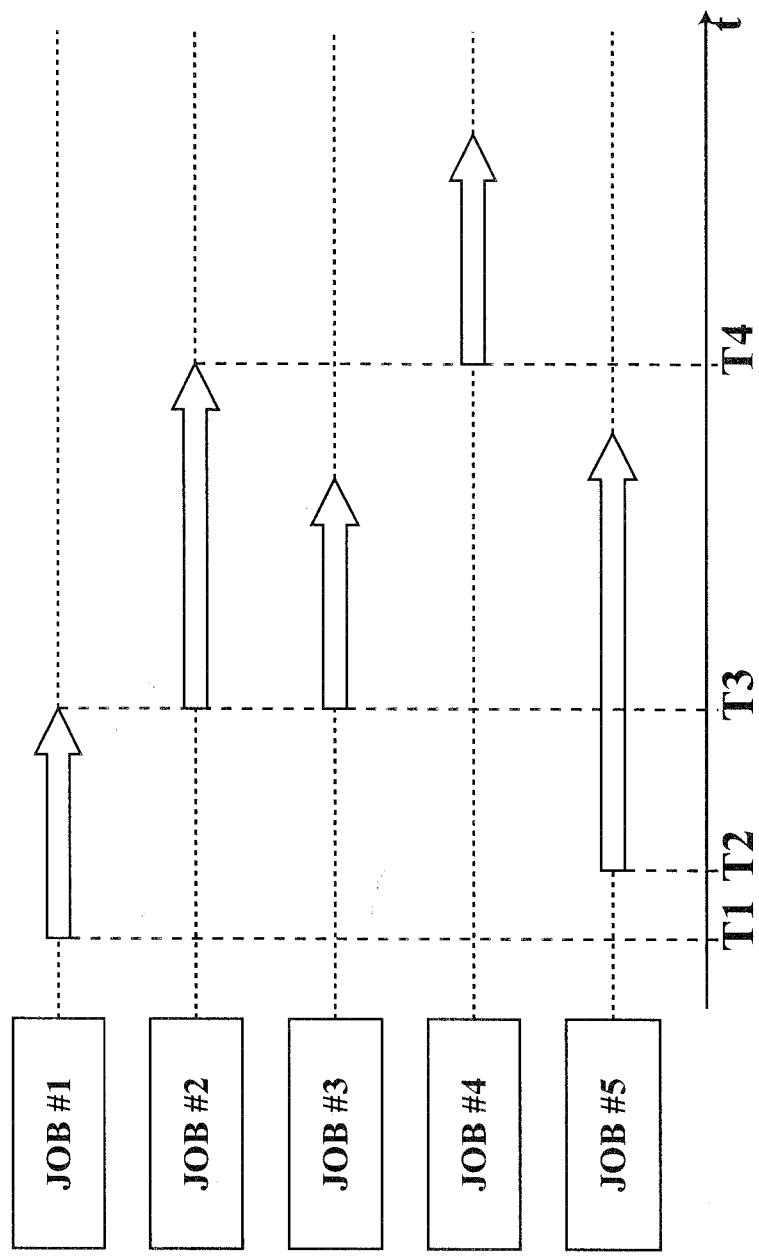
FIG. 4 is a diagram illustrating the order in which respective jobs are executed in the resource specification table illustrated in FIG. 3.

FIG. 4 is a diagram illustrating the order in which the jobs are executed in the case that the resource specification table 7*a* illustrated in FIG. 3 is referred. In the case that any job is not generated before a time T1, when the job #1 is generated at the time T1, execution of the job #1 is started immediately. Then, when the jobs #2, #3, #4 and #5 are generated in this order while the job #1 is being executed, the resource specification table 7*a* becomes the state illustrated in FIG. 3. The job #2 uses the resource B that the job #1 is currently using, so that the right of execution is not provided to the job #2 until execution of the job #1 is completed. Likewise, the job #3 uses the resource A that the job #1 is currently using, so that the right of execution is not provided to the job #3 until execution of the job #1 is completed. The job #4 does not use the resources A and B that the job #1 is currently using. However the job #4 uses a resource C that the job #2, which is an incomplete job having the priority higher than that of the job #4, uses. Thus, the right of execution is not provided to the job #4 until execution of the job #2 is completed. The job #5 does not use the resources A and B that the job #1 is currently using and does not use resources that the jobs #2, #3 and #4, which are incomplete jobs of the priorities higher than that of the job #5, use. Thus, upon generation of the job #5 (at a time T2), the right of execution is provided to the job #5 immediately. Then, when execution of the job #1 is completed (at a time T3), the rights of execution are provided to the jobs #2 and #3. Then, when execution of the job #2 is completed (at a time T4), the right of execution is provided to the job #4.

The job managing section 31 provides the jobs the rights of execution in order in the above-described manner.

Next, the operations of the image forming apparatus will be described.

Figure 5:
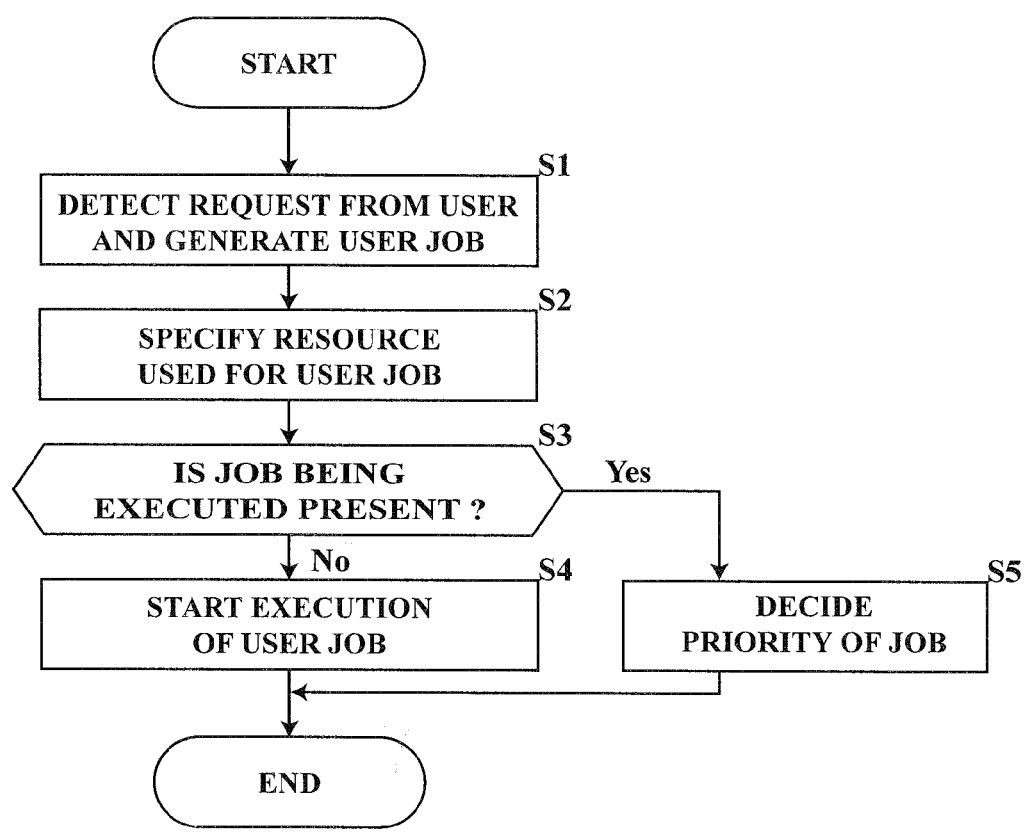
FIG. 5 is a flowchart illustrating operations of the image forming apparatus illustrated in FIG. 1.

FIG. 5 is a flowchart illustrating the operations of the image forming apparatus illustrated in FIG. 1.

The job managing section 31 detects a request from a user on the basis of a user operation performed through the operation panel 10 and then generates a job corresponding to the request (step S1). Examples of the kinds of jobs to be generated include a copy job, a facsimile transmission job, and the like.

Next, the job managing section 31 specifies the attribute of the job on the basis of the user operation and specifies the resource (in this embodiment, one or more circuits selected from among the circuits 13, 14, 15, 20, and 21 for performing predetermined image processing) used for the job on the basis of the attribute (step S2). For example, as the attributes of the jobs, propriety of the image enlargement/reduction processing, propriety of the image rotation processing, and the like are provided. These attributes are specified on the basis of the user operation. The job managing section 31 specifies the priority of the job on the basis of the kind and the attribute of the job. Then, the job managing section 31 registers the resources used for the job and the priority of the job in the resource specification table 7*a*.

For example, one-word data that has been allocated in advance to each of all the resources on a bit by bit basis (that is, each bit of the one-word data corresponds to a particular resource) is prepared in advance. A value of the one-word data indicates whether each resource is used in accordance with the bit values. Then, the one-word data is retained in the resource specification table 7*a* per job.

For example, in the case of a copy job of copying an image formed on an A4-size sheet onto an A3-size sheet of paper, image enlargement processing and image rotation processing are necessary. In order to execute the copy job, at least the scalar circuit 14 and the image rotation circuit 15 are used as the resources, and the image enlargement processing and the image rotation processing are performed concurrently.

Then, the job managing section 31 determines whether a job being executed currently is present (step S3). In the case that the job being executed currently is not present, execution of the generated job is started immediately (step S4).

On the other hand, in the case that the job being executed currently is present, the conflict judging section 32 refers to the resource specification table 7*a*. The conflict judging section 32 judges whether any one of the resources used for the generated job is the same as any one of the resources used for an incomplete job (including the job being executed currently) having a priority higher than that of the generated job (step S5). Then, when it has been decided that any of the resources used for the generated job is not the same as any of the resources used for the incomplete job having a priority higher than that of the generated job, the job managing section 31 provides the generated job the right of execution.

On the other hand, when any one of the resources used for the generated job is the same as any one of the resources used for the incomplete job having the priority higher than that of the generated job, the generated job is not executed but, is instead saved as a job waiting to be executed. Subsequently, when it has been determined that any of the resources used for the job waiting to be executed is not the same as any of the resources used for the incomplete job having a priority higher than that of the job waiting to be executed, the job managing section 31 provides the job waiting to be executed the right of execution.

The job managing section 31 decides which job(s) having the right of execution are present when execution of processing of one page in a currently executed job is completed and then executes the job(s) having the right of execution. That is, in the case that a job that is currently being executed, the job having the right of execution is not executed immediately. When execution of processing of one page in the job currently being executed is completed, the job(s) having the right of execution may be executed.

If a plurality of jobs are present that do not require conflicting resources, the job managing section 31 may execute the plurality of jobs concurrently.

Then, the job managing section 31 provides the data processing device 1a command to execute processing of one page of one or more of the plurality of jobs. The data processing device 1 performs processing specified by the job in accordance with the command.

According to the above-described embodiment, the image forming apparatus includes the plurality of resources (for example, circuits 13, 14, 15, 20 and 21) that implement the plurality of functions and executes the jobs in order of priority by using these resources. Then, the conflict judging section 32 determines whether any one or more resources used for a job is the same as any one or more resources used for an incomplete job having a priority higher than that of the job. When the conflict judging section 32 has determined that any of the resources used for each of a plurality of jobs is not the same as any of the resources used for the incomplete job having the priority higher than that of each job, the job managing section 31 provides the plurality of jobs the rights of execution concurrently.

Accordingly, when jobs are present that use only resources that are not used for another job, these jobs may be executed concurrently. Therefore, the utilization factor of the resources may be increased, to allow for performing a plurality of different kinds of processing.

For example, the circuits 20 and 21 are used and the circuits 13, 14 and 15 are not used for execution of a copy job at an isometric magnification. On the other hand, the circuits 14 and 15 are used and the circuits 20 and 21 are not used for execution of a transmission job including the image enlargement processing. Therefore, these jobs may be executed concurrently.

According to the above-described embodiment, the job managing section 31 decides which job(s) have the right of execution when execution of processing of one page in the currently executed job is completed and executes the job(s) having the right of execution.

Accordingly, the job(s) having the right of execution may be switched when execution of processing of one page is completed. Therefore, execution of the job up to the middle of one page is not discarded. In addition, even when a plurality of jobs are generated in succession, the order in which the jobs are executed may be dynamically and appropriately changed in accordance with the priority.

The present invention includes various other embodiments. For example, other designs can be used in which the above-described components are each performed.

Although circuits are provided as examples of the resources in the above-described embodiment, other physical devices or circuits (such as a memory, a memory area, a scanner and a print engine) may be provided as the resources.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus that executes pending jobs in order of priority comprising:
   resources used for executing the pending jobs;
   a conflict judging section configured to determine whether any one of the resources required for a particular one of the pending jobs is the same as any one of the resources required for pending jobs having a priority higher than that of the particular job; and
   a job managing section configured to provide the particular job a right of execution responsive to a determination by the conflict judging section that any one or more of the resources required for the particular job is not the same as any of the resources required for pending jobs having a priority higher than that of the particular job,
   wherein:
   the resources include application specific integrated circuits (ASICs) comprising an image processing circuit, a scalar circuit, an image rotation circuit, a raster processing circuit, and a half tone processing circuit, and
   the conflict judging section and the job managing section include processors coupled to the ASICs.

2. The image forming apparatus according to claim 1, wherein:
   the job managing section is configured to concurrently provide a plurality of particular pending jobs with rights of execution responsive to a determination by the conflict judging section that any of the resources required for each of the plurality of particular pending jobs is not the same as any of the resources required for pending jobs having a priority higher than those of the plurality of particular pending jobs.

3. The image forming apparatus according to claim 1, wherein:
   the job managing section is configured to store the particular pending job as a job waiting to be executed in response to a determination by the conflict judging section that any one of the resources required for the particular pending job is the same as any one of the resources required for pending jobs having a priority higher than that of the particular pending job.

4. The image forming apparatus according to claim 1, wherein:
   the job managing section is configured to (i) determine whether a pending job having the right of execution is present when execution of processing of one page in a currently executed job is completed and (ii) execute the job having the right of execution.

5. The image forming apparatus according to claim 1, further comprising a resource specification table, wherein:
   the job managing section is configured to specify the resources and the priority of the particular pending job and register the resources and the priority of the particular pending job in the resource specification table, and
   the conflict judging section is configured to determine based on the contents of the resource specification table.

6. The image forming apparatus according to claim 5, wherein:
the job managing section is configured to specify the resources on the basis of one or more attributes of the particular pending job.

7. The image forming apparatus according to claim 6, wherein:
the one or more attributes of the particular pending job is set by a user operation performed through an operation panel.

8. The image forming apparatus according to claim 6, wherein:
the one or more attributes of the particular pending job include propriety of image enlargement/reduction processing and propriety of image rotation processing.

9. The image forming apparatus according to claim 5, wherein:
when execution of the particular pending job is completed, the job managing section is configured to delete the particular pending job from the resource specification table.

10. The image forming apparatus according to claim 1, wherein:
the particular one of the pending jobs has a priority level below a first other pending job and a second other pending job, the first other pending job and the second other pending job having overlapping resource requirements, the second other pending job requiring at least one resource required by the particular one of the pending jobs, and the first other pending job not requiring any resources that overlap with the particular one of the pending jobs; and
the job managing section is configured to (i) provide the first other pending job with a right of execution and (ii) refrain from providing the particular job a right of execution until after the second other pending job has completed despite the resources required by the particular one of the pending jobs not overlapping with the first other pending job.

11. An image forming apparatus that executes pending jobs in order of priority comprising:
resources used for executing the pending jobs;
a conflict judging section configured to determine whether any one of the resources required for particular ones of the pending jobs is the same as any one of the resources required for pending jobs having a priority higher than those of the particular ones of the pending jobs; and
a job managing section configured to (i) provide the particular ones of pending jobs rights of execution concurrently responsive to a determination by the conflict judging section that any of the resources required for each of the particular ones of pending jobs is not the same as any of the resources required for the pending jobs having a priority higher than those of the particular ones of the pending jobs, (ii) determine whether the one or more jobs having the right of execution is present when execution of processing of one page in a job currently being executed is completed, and (iii) execute the one or more jobs having the right of execution,
wherein:
the resources include application specific integrated circuits (ASICs) comprising an image processing circuit, a scalar circuit, an image rotation circuit, a raster processing circuit, and a half tone processing circuit, and
the conflict judging section and the job managing section include processors coupled to the ASICs.

12. An image forming method of executing pending jobs in order of priority using resources comprising:
a conflict judging step of determining whether any one of the resources required for a particular one of the pending jobs is the same as any one of the resources required for pending jobs having a priority higher than that of the particular job; and
a job managing step of giving the particular job a right of execution responsive to a determination in the conflict judging step that any of the resources required for the particular job is not the same as any of the resources required for the pending jobs having a priority higher than that of the particular job,
wherein the resources include application specific integrated circuits (ASICs) comprising an image processing circuit, a scalar circuit, an image rotation circuit, a raster processing circuit, and a half tone processing circuit.

13. The image forming method according to claim 12, wherein:
the job managing step comprises concurrently providing a plurality of particular pending jobs with rights of execution responsive to a determination in the conflict judging step that any of the resources required for each of the plurality of particular pending jobs is not the same as any of the resources required for the pending jobs having a priority higher than those of the plurality of the particular pending jobs.

14. The image forming method according to claim 12, wherein:
the job managing step comprises storing the particular pending job as a job waiting to be executed responsive to a determination in the conflict judging step that any one of the resources required for the particular pending job is the same as any one of the resources required for the pending jobs having a priority higher than that of the particular pending job.

15. The image forming method according to claim 12, wherein:
the job managing step comprises (i) determining whether a pending job having the right of execution is present when execution of processing of one page in a currently executed job is completed and (ii) executing the job having the right of execution.

16. The image forming method according to claim 12, wherein:
the job managing step comprises (i) concurrently providing a plurality of particular pending jobs with rights of execution responsive to a determination in the conflict judging step that any of the resources required for each of the plurality of particular pending jobs is not the same as any of the resources required for the pending jobs having a priority higher than the particular pending jobs, (ii) determining whether pending jobs having the right of execution are present when execution of processing of one page in a currently executed job is completed, and (iii) executing the pending jobs having the right of execution.

17. The image forming method according to claim 12, wherein:
the particular one of the pending jobs has a priority level below a first other pending job and a second other pending job, the first other pending job and the second other pending job having overlapping resource requirements, the second other pending job requiring at least one resource required by the particular one of the pending jobs, and the first other pending job not requiring any resources that overlap with the particular one of the pending jobs; and the job managing step comprises (i) providing the first other pending job with a right of execution and (ii) refraining from providing the particular job a right of execution until after the second other pending job has completed despite the resources required by the particular one of the pending jobs not overlapping with the first other pending job.

* * * * *